United States Patent
Zheng et al.

(10) Patent No.: US 11,657,300 B2
(45) Date of Patent: May 23, 2023

(54) SYSTEMS AND METHODS FOR PREDICTING STORAGE DEVICE FAILURE USING MACHINE LEARNING

(71) Applicant: Samsung Electronics Co., Ltd., Suwon-si (KR)

(72) Inventors: Qinling Zheng, San Jose, CA (US); Nima Elyasi, San Jose, CA (US); Vikas Sinha, Sunnyvale, CA (US); Changho Choi, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 380 days.

(21) Appl. No.: 15/931,573

(22) Filed: May 13, 2020

(65) Prior Publication Data
US 2021/0264294 A1 Aug. 26, 2021

Related U.S. Application Data

(60) Provisional application No. 62/982,055, filed on Feb. 26, 2020.

(51) Int. Cl.
*G06N 5/04* (2023.01)
*G06N 20/00* (2019.01)
*G06F 11/16* (2006.01)

(52) U.S. Cl.
CPC .............. *G06N 5/04* (2013.01); *G06F 11/16* (2013.01); *G06N 20/00* (2019.01)

(58) Field of Classification Search
CPC ........... G06N 5/04; G06N 20/00; G06F 11/16
USPC ........................................................ 706/12
See application file for complete search history.

(56) References Cited

U.S. PATENT DOCUMENTS

| 7,162,373 | B1* | 1/2007 | Kadioglu | F01D 21/003 |
| | | | | 702/35 |
| 7,730,364 | B2 | 6/2010 | Chang et al. | |
| 9,189,309 | B1 | 11/2015 | Ma et al. | |
| 9,282,008 | B2 | 3/2016 | Shah et al. | |

(Continued)

OTHER PUBLICATIONS

Narayanan Iyswarya et al., "SSD Failures in Datacenters: What? When? and Why?", SYSTOR '16, Jun. 6-8, 2016, Haifa, Israel, 11 pages.

*Primary Examiner* — Tauqir Hussain
(74) *Attorney, Agent, or Firm* — Renaissance IP Law Group LLP

(57) ABSTRACT

A method for predicting a time-to-failure of a target storage device may include training a machine learning scheme with a time-series dataset, and applying the telemetry data from the target storage device to the machine learning scheme which may output a time-window based time-to-failure prediction. A method for training a machine learning scheme for predicting a time-to-failure of a storage device may include applying a data quality improvement framework to a time-series dataset of operational and failure data from multiple storage devices, and training the scheme with the pre-processed dataset. A method for training a machine learning scheme for predicting a time-to-failure of a storage device may include training the scheme with a first portion of a time-series dataset of operational and failure data from multiple storage devices, testing the machine learning scheme with a second portion of the time-series dataset, and evaluating the machine learning scheme.

21 Claims, 7 Drawing Sheets

(56) References Cited

U.S. PATENT DOCUMENTS

| | | | |
|---|---|---|---|
| 10,048,996 B1* | 8/2018 | Bell | G06F 11/3006 |
| 10,095,504 B1* | 10/2018 | Khokhar | G06F 11/0709 |
| 10,152,394 B2* | 12/2018 | Demetriou | G06N 5/022 |
| 11,301,315 B2* | 4/2022 | Bi | G06F 11/30 |
| 2007/0179784 A1* | 8/2007 | Thambiratnam | G10L 15/26 |
| | | | 704/E15.045 |
| 2016/0335151 A1* | 11/2016 | Swierk | G06F 21/50 |
| 2016/0342903 A1 | 11/2016 | Shumpert | |
| 2016/0378628 A1* | 12/2016 | Nguyen | G06F 11/2236 |
| | | | 714/40 |
| 2017/0034023 A1* | 2/2017 | Nickolov | H04L 43/0817 |
| 2017/0220672 A1 | 8/2017 | Sainani et al. | |
| 2017/0220938 A1* | 8/2017 | Sainani | G06F 16/248 |
| 2017/0249429 A1* | 8/2017 | Jain | A61B 5/0086 |
| 2018/0089042 A1* | 3/2018 | Demetriou | G06Q 10/0631 |
| 2018/0246941 A1* | 8/2018 | Salunke | G06F 16/2477 |
| 2019/0155682 A1* | 5/2019 | Sinha | G06F 11/1008 |
| 2019/0243691 A1* | 8/2019 | LaBute | H04L 47/70 |
| 2019/0278663 A1* | 9/2019 | Mehta | G06F 3/067 |
| 2019/0339989 A1* | 11/2019 | Liang | G06N 20/00 |
| 2019/0354628 A1* | 11/2019 | Grunwald | G06F 3/067 |
| 2020/0216900 A1* | 7/2020 | Bunyavanich | C40B 40/08 |
| 2020/0239964 A1* | 7/2020 | Gross | G16B 20/00 |
| 2020/0242000 A1* | 7/2020 | Khosrowpour | G06F 11/3608 |
| 2020/0265324 A1* | 8/2020 | Ferreira Moreno | |
| | | | G06F 16/90335 |
| 2020/0285203 A1* | 9/2020 | Thakur | G06N 3/08 |
| 2020/0293900 A1* | 9/2020 | Nigam | G06F 11/323 |
| 2020/0295986 A1* | 9/2020 | Rathinasabapathy | H04L 67/34 |
| 2020/0305049 A1* | 9/2020 | Vasseur | H04W 36/32 |
| 2020/0314022 A1* | 10/2020 | Vasseur | G06K 9/6264 |
| 2021/0082292 A1* | 3/2021 | Sindhwani | G08G 5/0069 |
| 2021/0110262 A1* | 4/2021 | Schmitt | G06N 3/088 |
| 2021/0158106 A1* | 5/2021 | Vasseur | H04L 41/147 |
| 2021/0182188 A1* | 6/2021 | Ilic | G06F 11/0727 |
| 2021/0208002 A1* | 7/2021 | Meggers | G01J 5/026 |
| 2021/0311442 A1* | 10/2021 | Biercuk | G06N 10/00 |
| 2021/0335061 A1* | 10/2021 | Claessens | G07C 5/0808 |
| 2022/0036223 A1* | 2/2022 | Eto | G06N 7/00 |
| 2022/0187815 A1* | 6/2022 | Sinha | G05B 23/0281 |
| 2022/0215273 A1* | 7/2022 | Sethi | G06F 3/0653 |

\* cited by examiner

FIG. 5

Failure Data Split

Failed Devices

| 4 Weeks to Failure | | 3 Weeks to Failure | | 2 Weeks to Failure | | 1 Week to Failure | |
|---|---|---|---|---|---|---|---|
| Train-$F_4$ (5 Days) | Test-$F_4$ (2 Days) | Train-$F_3$ (5 Days) | Test-$F_3$ (2 Days) | Train-$F_2$ (5 Days) | Test-$F_2$ (2 Days) | Train-$F_1$ (5 Days) | Test-$F_1$ (2 Days) |

→ Time

FIG. 6

Operational Data Split

Operational Devices

| Data Collection Period minus 4 Weeks | Last 4 Weeks of Data |
|---|---|
| Train-O | Test-O |

→ Time

FIG. 7

Training/Test Data Split

| Training Set | | Test Set | |
|---|---|---|---|
| Data Collection Period minus 4 Weeks | Failure | Operational | Failure |
| Train-O | Train-$F_{1,2,3,4}$ | Test-O | Test-$F_{1,2,3,4}$ |

| Training Set | | Test Set | |
|---|---|---|---|
| Data Collection Period minus 4 Weeks | Failure | Operational | Failure |
| Train-O | Train-$F_{1,2,3,4}$ | Test-O | Test-$F_{1,2,3,4}$ |

| Training Set | | Test Set |
|---|---|---|
| Validate | Train | Test Set |

Predicted Class

|  |  | O | $F_1$ | $F_2$ | $F_3$ | $F_4$ |
|---|---|---|---|---|---|---|
| | O | 17171 | 0 | 0 | 0 | 0 |
| | $F_1$ | 0 | 6 | 10 | 0 | 0 |
| True Class | $F_2$ | 0 | 0 | 7 | 9 | 0 |
| | $F_3$ | 0 | 0 | 0 | 8 | 8 |
| | $F_4$ | 0 | 0 | 0 | 0 | 16 |

SYSTEMS AND METHODS FOR PREDICTING STORAGE DEVICE FAILURE USING MACHINE LEARNING

CROSS-REFERENCE TO RELATED APPLICATION

This application claims priority to, and the benefit of, U.S. Provisional Patent Application Ser. No. 62/982,055 titled "Time-To-Failure Prediction For Storage Drives" filed Feb. 26, 2020 which is incorporated by reference.

TECHNICAL AREA

This disclosure relates generally to failure prediction, and specifically to time-to-failure predictions that may use machine learning.

BACKGROUND

The failure of a storage device in a storage system may lead to data corruption and/or permanent data loss, as well as the expenditure of time and/or financial resources associated with restoring and/or reconstructing corrupted data. To avoid these problems, storage systems may employ multilevel redundancies and/or timely replacement of storage devices. However, these practices may lead to increased costs.

SUMMARY

A method for predicting a time-to-failure of a target storage device may include training a machine learning scheme with a time-series dataset of operational and failure data from one or more storage devices, receiving telemetry data from the target storage device, and inputting the telemetry data to the machine learning scheme, wherein the machine learning scheme may output a time-window based time-to-failure prediction for the target storage device in response to the telemetry data. The machine learning scheme may output at least two classes, and one or more of the at least two classes may include time windows. Training the machine learning scheme may include splitting the time-series dataset into time windows, and a class may correspond to a time window. The operational and failure data may be split into time windows based on a time-to-failure.

A method for training a machine learning scheme for predicting a time-to-failure of a storage device may include pre-processing a time-series dataset of operational and failure data from one or more storage devices, thereby generating a pre-processed dataset, and training the machine learning scheme with the pre-processed dataset, wherein the machine learning scheme may generate a time-window based time-to-failure prediction. The time-series dataset comprises one or more features associated with a storage device, and the method may further include ranking at least two of the features. The method may further include limiting a number features included in the pre-processed dataset, thereby reducing a dimension of the pre-processed dataset. The method may further include ranking the features by at least one of recursive feature elimination, correlation attribute evaluation, gain ratio attribute evaluation, or information gain attribute evaluation. The method may further include removing noise from at least a portion of the time-series dataset. The method may further include modifying at least a portion of the time-series dataset by at least one of data transformation, data aggregation, or data standardization. The method may further include removing at least one redundant feature of the features.

A method for training a machine learning scheme for predicting a time-to-failure of a storage device may include receiving a time-series dataset of operational and failure data from one or more storage devices, training the machine learning scheme with a first portion of the time-series dataset, testing the machine learning scheme with a second portion of the time-series dataset, and evaluating the machine learning scheme. evaluating the machine learning scheme may include calculating a performance score. The performance score may include one or more of a precision component, a recall component, or an F-score component. The performance score may be based on two or more components, and a maximum of the two or more components may be used as the performance score. One or more of the two or more components may be weighted. The machine learning scheme may be evaluated with a cost function. The cost function may include a user-defined cost function, and the method may further include minimizing the user-defined cost function. The cost function may be based on a confusion matrix. The confusion matrix may include one or more weight classes for rewards or penalties associated with early or late predictions, respectively.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the features of the present disclosure.

FIG. 5 illustrates an example embodiment of a data split and labeling according to this disclosure.

FIG. 6 illustrates an example embodiment of a data split for operational devices according to this disclosure.

FIG. 7 illustrates an example embodiment of a training-testing data split according to this disclosure.

DETAILED DESCRIPTION

Figure 1:
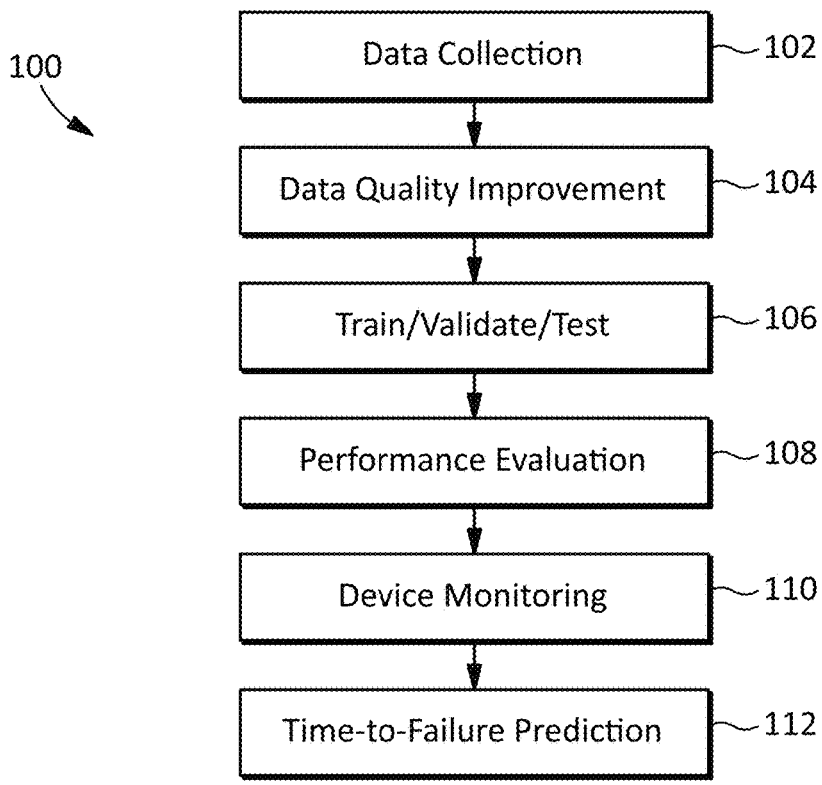
FIG. 1 illustrates a flow chart of an embodiment of a method according to this disclosure.

The inventive features of this disclosure relate to the use of machine learning to analyze data collected over time to predict a time-to-failure for a device such as a storage device. The implementation of a machine learning scheme for predicting a time-to-failure may present one or more challenges. For example, some operating parameters of a storage device may reach expected values at a point of failure. However, the complexity of some parameters may make it difficult for a machine learning scheme to predict when the parameter may reach the expected value. A further potential difficulty is that there may be multiple types of device failures, each of which may have one or more parameters associated with the fault. Moreover, the progression of some parameters may not be linear. For example, the progression of the severity of a fault and/or one or more accompanying parameters may increase at a higher rate as the device approaches failure. Additionally, datasets collected over time for storage devices may be difficult to use for training a machine learning scheme because they may be imbalanced, for example, with limited failure data points.

To address any number of these and/or other challenges, this disclosure includes numerous inventive features, including the use of time-series data for training and/or using machine learning systems, the use of time-window based time-to-failure predictions, the use of multi-class classification systems, the use of various techniques to evaluate scheme performance, the use of various techniques for data quality improvement and/or other inventive features. The inventive features described herein have independent utility and may be implemented independently. However, the inventive features may also be implemented in various combinations which may produce synergistic results.

According to some features of this disclosure, in some embodiments, a time-to-failure of a device such as a storage device may be predicted in terms of one or more time windows prior to failure, rather than, or in addition to, a specific failure point. For example, predicting that a storage device may fail in the next few days or weeks may enable a user or data center to repair or replace the device in a timely manner prior to data corruption, loss, and/or the like.

Some additional inventive features of this disclosure relate to time-to-failure predictions that may use one or more multi-class classification schemes for machine learning. For example, in some embodiments, the disclosed systems can employ a multi-class classification that may have one or more classes implemented as time windows wherein different time windows may represent different amounts of time until a predicted failure point. In some embodiments, a time-window scheme may be trained, for example, using one or more time series datasets of static and/or historical data, and/or data observations obtained from operational and/or failed devices. In some embodiments, a time-window scheme may provide additional information into the relative importance and/or effects of certain features associated with the device, for example, for purposes of ranking such features.

Some additional inventive features of this disclosure relate to techniques for evaluating the performance of a machine learning scheme for failure predictions. In some embodiments, the performance of a scheme may be evaluated by calculating a performance score associated with the method. Examples of elements that may be used to calculate a performance score include one or more of a precision, a recall, an F-score, and/or the like. In some embodiments, the performance of a scheme may be evaluated with one or more reward/penalty cost functions, for example, using a confusion matrix with one or more weight classes for rewards and/or penalties.

Some additional inventive features of this disclosure relate to techniques for data quality improvement (DQI) for training data for a machine learning scheme for failure predictions. In some embodiments, DQI techniques may be used to process data such as, for example, high-volume telemetry data to remove information that may negatively impact and/or overburden a machine learning algorithm. Examples of features that may be implemented in an embodiment of a DQI framework (DQIF) according to this disclosure include one or more of data source management, data cleansing, data transformation, data aggregation, data standardization, data generalization, data feature ranking, data feature selection, data labeling, combinations thereof, and/or the like.

FIG. 1 illustrates a flow chart of an embodiment of a method according to this disclosure. The method 100 illustrated in FIG. 1 may include a data collection operation 102 in which time-series data may be collected from one or more devices such as storage devices over a period of time to provide a time-series dataset for training a machine learning scheme. For example, self-monitoring attributes may be collected from one or more hard disk drives (HDDs) and/or solid state drives (SSDs) over a period of days, weeks, months and/or years, and/or any other suitable periodic or aperiodic time frame. The method 100 may also include a DQI operation 104 that may refine the time-series dataset to generate a pre-processed dataset. The method 100 may also include a train/validate/test operation 106 for training, validation, and/or testing one or more machine learning schemes using the time-series dataset from the data collection operation 102 and/or the pre-processed dataset from the DQI operation 104. The method 100 may also include an evaluation operation 108 in which the performance of the one or more trained machine learning schemes may be evaluated, for example, by calculating a performance score and/or using a cost function as may be defined, for example using a confusion matrix. The method 100 may also include a monitoring operation 110 in which instantaneous and/or time-series data from an operating target device such as a storage device may be collected for purposes of predicting a time-to-failure for the target device. For example, telemetry data such as self-monitoring attributes from an operating storage device may be collected. The method 100 may also include a prediction operation 112 in which the data collected for the target device may be input to a machine learning scheme to provide a time-to-failure prediction for the target device. For example, the collected data may be input to the one or more machine learning schemes that were trained, validated, and/or tested in the operation 106.

In some embodiments, some operations may be left out and/or others added and/or the order of operations may be changed. For example, in some embodiments, the data collection operation 102 may be omitted partially or entirely based on using an available dataset, or portion thereof in combination with collecting more data. As another example, the DQI operation 104 may be omitted partially or entirely based on the collected data being pre-processed and/or collected in a manner that is usable by the one or more machine learning schemes, or the specific type and/or implementation of one or more machine learning schemes may be able to use the data as collected or available. As yet another example, the train/validate/test operation 106 may be omitted, for example, because a machine learning scheme may be pre-trained, validated, and/or tested. The evaluation operation 108 may be omitted based on, for example, a desired level of accuracy, prior experience with the one or more schemes, and/or the like. The operations illustrated in FIG. 1 are only example operations, and embodiments may involve various additional steps not explicitly covered.

The operations in the method 100 illustrated in FIG. 1 may be implemented in hardware, software or any combination thereof, within a single device, system, platform, program, process, etc., or distributed between multiple such entities. For example, in some embodiments, telemetry data may be collected from storage devices by a storage controller located in a rack with the storage devices. The telemetry data may then be transferred to a cloud-based platform for DQI, training, validation, testing and evaluation. A fully-trained machine learning scheme may then be deployed on a supervisory processor in a storage chassis, rack, datacenter, and/or the like, where monitoring and prediction may be conducted based on the scheme. In other embodiments, all operations may be performed remotely on a cloud-based platform. In some embodiments, one or more of the operations illustrated in FIG. 1 may be performed on a system such as that described below with respect to FIG. 13. Countless other arrangements may be implemented according to the features of this disclosure.

Figure 2:
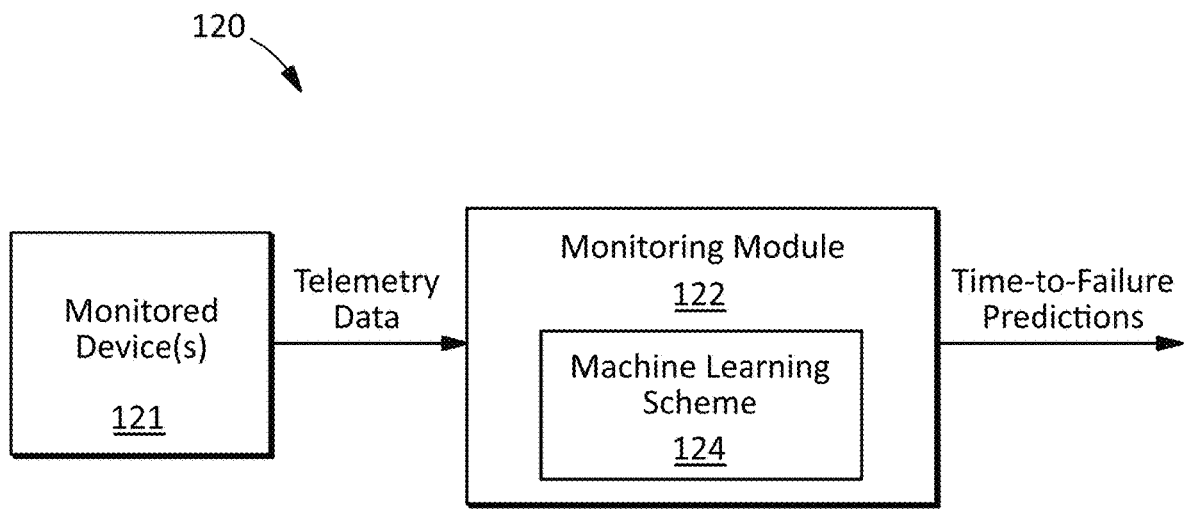
FIG. 2 illustrates an embodiment of a monitoring system according to this disclosure.

FIG. 2 illustrates an embodiment of a monitoring system according to this disclosure. The system 120 may include a monitoring module 122 which may receive time-series telemetry data from one or more devices 121 being monitored for time-to-failure. The monitoring module 122 may include a machine learning scheme 124 that may be trained to predict a time-to-failure for one or more of the devices 121 based on the telemetry data. The monitoring module 122 may transmit one or more time-to-failure predictions to a user, a datacenter manager, and/or the like. The system 120 may be implemented in hardware, software or any combination thereof, within a single device, system, platform, program, process, etc., or distributed between multiple such entities, including a system such as that described below with respect to FIG. 13.

For example, in some embodiments, the monitoring module 122 may be implemented as a software module running on a supervisory device such as a baseboard management controller (BMC) in a chassis housing storage devices. In some other embodiments, the monitoring module 122 may be implemented as a software process on a cloud-based platform for managing a storage area network. In some other embodiments, the monitoring module 122 may be implemented in or at a device that is being monitored for time-to-failure. For example, the monitoring module 122 may be implemented in a storage device, for example running on a storage processing unit (SPU) within an SSD. In such an embodiment, the data used to monitor one or more features (parameters) of a device may still be referred to as telemetry data, even though it may not leave the device. Thus, telemetry data may refer to any data used to monitor the state of a device for predicting a time-to-failure for the device.

Some example embodiments of systems, processes, methods, and/or the like illustrating some possible implementation details according to this disclosure are described below. These examples are provided for purposes of illustrating the features of this disclosure, but the features are not limited to these embodiments, implementation details, and/or the like.

Data Quality Improvement

In some embodiments, raw telemetry data such as self-monitoring attributes may be collected from a relatively large pool of storage devices over, for example, a multi-year period to provide a high-volume time-series dataset for training a machine learning scheme. Such datasets may include some data that may be irrelevant and/or redundant to a machine learning scheme. Applying a data quality improvement framework (DQIF) to the time-series dataset according to this disclosure may eliminate any or all of these unwanted data. Moreover, a DQIF according this disclosure may also generalize any or all of the data and/or provide feature ranking, selection, and/or labeling. Thus, a DQIF according to this disclosure may generate a pre-processed dataset that, depending on the implementation details, may improve any number of downstream processes and/or results including training, validation, testing, and/or scheme prediction accuracy.

Figure 3:
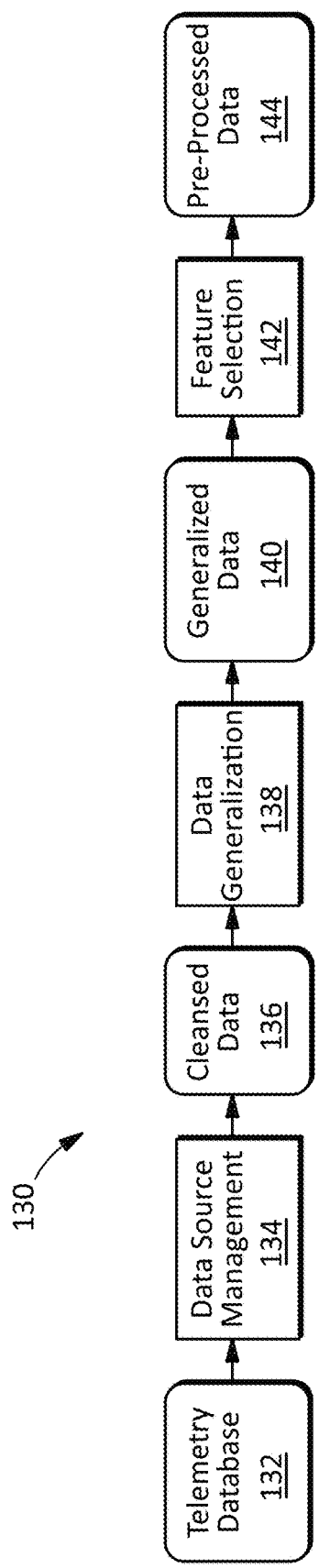
FIG. 3 illustrates some components and data flow in an example embodiment of a data quality improvement framework (DQIF) according to this disclosure.

FIG. 3 illustrates some components and data flow in an example embodiment of a data quality improvement framework (DQIF) according to this disclosure. The framework 130 may include a data source management (DSM) operation 134 that may receive an input time-series dataset from, for example, a telemetry database (TMDB) 132. The DSM operation 134 may remove data that may be irrelevant, redundant, and/or the like, while retaining data that may be helpful for predicting failure. Examples of data that may be removed include attributes such as world wide name (WWN), system model identifier, and/or the like. Examples of data that may be retained include time stamps (such as error log timestamps) and power on hours/days (POH Days). Additional examples of data that may be retained include total temperature throttle count, percentage of drive life, uncorrectable error correction code (UECC) sector count, total erase error, total unrecovered read error, total program error, and/or total recovered read error.

The DSM operation 134 may output cleansed data 136 which may be processed by a generalization operation 138 which may apply data transformation, data aggregation, and/or data standardization to obtain generalized data 140 which, depending on the implementation details, may improve any number of downstream processes and/or results including training, validation, testing, and/or scheme prediction accuracy.

The generalized data 140 may be processed by a feature selection operation 142 which may implement one or more feature selection processes which may, depending on the implementation details, reduce computation time, improve prediction performance, provide an understanding of how the dataset may affect a machine learning scheme, and/or the like. In some embodiments, one or more of these feature processes may help select a set of relevant features that may be buried in high-dimensional data along with irrelevant noisy features, for example, by selecting a subset of the full dataset that may predict a time-to-fail for a device with improved accuracy.

One example of a feature selection process that may be implemented according to this disclosure is removal of still features, which may be features that may have little or no variation over all or a portion of the input dataset. By way of example, one or more features may be plotted using a parallel coordinate plot which may be scanned for features that show little or no variation. In some embodiments, and depending on the implementation details, one or more features that may generally be considered to be important indicators of whether a storage device may fail soon may nonetheless show little or no variation over a specific input dataset, and may therefore be safely removed without significantly affecting the accuracy of the scheme when trained with data from the specific dataset.

Another example of a feature selection process that may be implemented according to this disclosure is feature ranking, which may be realized with any number of supervised and/or unsupervised ranking approaches including recursive feature elimination (RFE), gain ratio feature (or attribute) evaluation, correlation attribute evaluation, information gain attribute evaluation, information gain ranking filtering, and/or the like.

In some embodiments, two or more feature ranking approaches may be used, and one or more features that rank relatively high using more than one approach may be retained. For example, in some embodiments, e.g., in which one or more tree-based classifiers may be used for a machine learning scheme, an RFE approach, which may select features by recursively considering smaller and smaller sets of features, may be used to generate a first ranked table of features. An information gain ranking filter, which may evaluate an attribute by measuring information gain with respect to a class, may be used to generate a second ranked table of features. A gain ratio feature evaluator, which may evaluate an attribute by measuring a gain ratio with respect to a class, may be used to generate a third ranked table of features. A feature may then be retained, for example if it ranks in a significant position in at least two of the three tables.

Another feature selection process that may be implemented according to this disclosure is redundancy removal. For example, a self-organizing neural network map (SOM) may be used to identify pairs or clusters of dependent features that may be redundant. Thus, one or more of the redundant features may be removed which may reduce the dimension of the dataset without significantly affecting the accuracy of one or more machine learning schemes.

Thus, the output of the feature selection operation 142 which may be pre-processed data 144, which, depending on the implementation details, may reduce computation time, improve prediction performance, provide additional information about the failure parameters and/or features of a device, and/or the like.

In some embodiments, one or more of the operations 134, 138 and/or 142 may be combined with one or more users' domain knowledge to enhance a DQIF according to this disclosure. For example, during a data source management operation 134, a user may retain a feature that may otherwise be removed and/or remove a feature that may otherwise be retained based, for example, on the user's experience with that feature. Likewise, during a feature selection operation 142, a user may override the selection or rejection of a feature that would otherwise be decided based on the feature's position in one or more ranking tables, in view of the user's experience with that feature. Domain knowledge may be accommodated, for example, through the use of a command line or graphical user interface (GUI) that may display a feature cleansing and/or selection process and enable to a user to intervene in the process.

Classification

According to the features of this disclosure, in some situations, the time-to-failure for a device may not need to be predicted with high accuracy and/or far in the future. For example, a user such as a datacenter may only need to know if a device is likely to fail within a relatively short amount of time to enable the device to be replaced before it fails. Thus, according to this disclosure, a time-to-failure may be predicted in terms of one or more time windows prior to failure. This may enable the use of one or more machine learning classification schemes to predict a time-to-failure for a device. For example, in some embodiments, a binary classification scheme may be trained to provide a yes/no prediction of whether a device is likely to fail within the next 30 days based on training with a time-series dataset of other devices. In some other embodiments, one or more multi-class classification schemes may be trained to provide one or more time-to-failure predictions in multiple time windows prior to a failure point.

Figure 4:
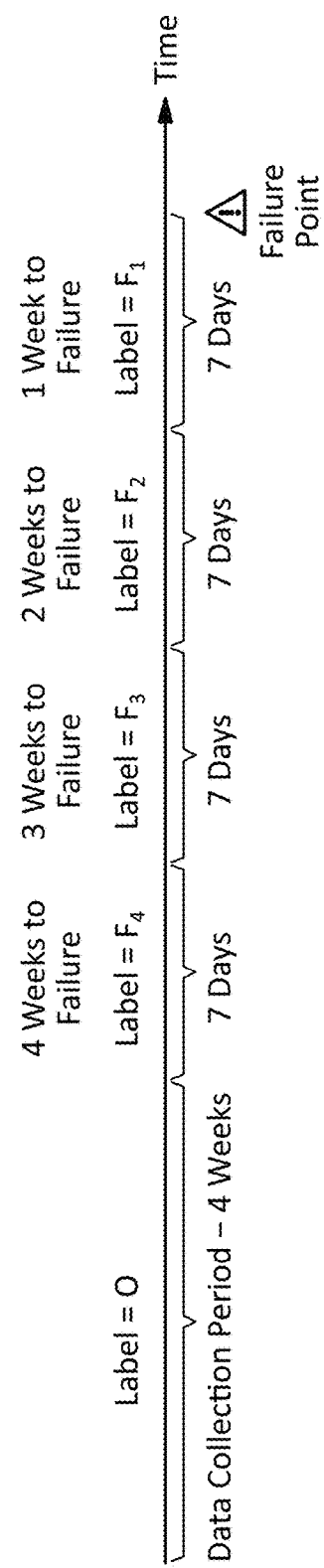
FIG. 4 illustrates an example embodiment of a multi-class machine learning classification structure and data labeling process according to this disclosure.

FIG. 4 illustrates an example embodiment of a multi-class machine learning classification structure and data labeling process according to this disclosure. In the embodiment illustrated in FIG. 4, time is indicated on a timeline having a horizontal axis with an expected failure point indicated by the exclamation point in a triangle. Operational devices may be labeled as O type devices as indicted at the left side of the timeline. Devices that may be likely to fail in one of four different one-week time windows prior to the expected failure point may be labeled as type $F_n$, where n=1, 2, 3, 4. Thus, a machine learning scheme may be trained with a time-series dataset (or pre-processed version of a dataset) to classify a device into one of five classes: O, $F_1$, $F_2$, $F_3$, or $F_4$ in response to applying telemetry data from the device to the machine learning scheme. The use of four failure classes and a single operational class, as well as one-week time windows is for purposes of illustration only. In other embodiments, any number of operational and/or failure classes and/or time widows may be used.

Although the features of this disclosure are not limited to any specific definition of Operational and/or failed devices, in some embodiments, a storage device may be considered to be failed if, for example, an underlying event, failure, and/or the like propagates to a corresponding storage controller causing it to be shut down for intervention and/or investigation. Thus, in some embodiments, a storage device may be considered a failed device if it causes a corresponding system downtime. In some other embodiments, a device may be considered a failed device if it reports one or more predetermined error events, if it fails to return correct data in response to a read command, if it fails to provide a write acknowledgement in response to a write command, and/or any other suitable indicia of failure.

Scheme Training, Validation and Testing

FIGS. 5-11 illustrate an example embodiment and implementation details of a process for training, validating and testing a machine learning scheme according to this disclosure. For purposes of illustration, the example embodiment and details are described in the context of a multi-class classification scheme using a random forest algorithm, but any other scheme and/or algorithm may be used such as logistic regression, naïve Bayes, gradient descent, k-nearest neighbors, decision trees of any type, support vector machine, and/or the like.

FIG. 5 illustrates an example embodiment of a data split and labeling according to this disclosure. The data split illustrated in FIG. 5 may show data for windows of 1, 2, 3 and 4 weeks prior to failure on a horizontal timeline for failed devices in a pre-processed time-series dataset based on telemetry data collected from a population of storage devices over a period of time. For each failure type, the data for each week may be split time-window wise into, for example, a 5-day training portion (Train-$F_n$, where n=1, 2, 3, 4) and a 2-day test portion (Test-$F_n$, where n=1, 2, 3, 4). The use of a time-window split (as opposed, for example, to a random split) may prevent information from bleeding from a training dataset to a testing dataset, which in turn may ensure the fairness of a performance test result. In some embodiments, and depending on the implementation details, testing random peaks (i.e., rather than fixed windows such as 5/2 day windows) may provide improved test results.

FIG. 6 illustrates an example embodiment of a data split for operational devices according to this disclosure. The data split illustrated in FIG. 6 may be shown on a horizontal timeline where operational devices may be split into a 4-week test portion (Test-O) having the most recent four weeks of data for operational devices. The data split may also have a training portion (Train-O) which may include the data for operational devices beginning at the start of the data collection window for the dataset, and ending at week 5, i.e., the beginning of the Test-O portion.

FIG. 7 illustrates an example embodiment of a training-testing data split according to this disclosure. The embodiment illustrated in FIG. 7 may be used, for example, for a training and validation operation and a testing operation on the pre-processed time-series dataset. A training portion of the dataset may include the Train-O data and the Train-$F_n$ data, where n=1, 2, 3, 4, whereas a test portion of the dataset may include the Test-O data and the Test-$F_n$ data, where n=1, 2, 3, 4. In some embodiments, the training-testing data split may be arranged so there is no overlap between the operational data in the training and test sets, and no overlap between the failure data in the training and test sets, as illustrated in FIG. 7.

Figures 8, 9:
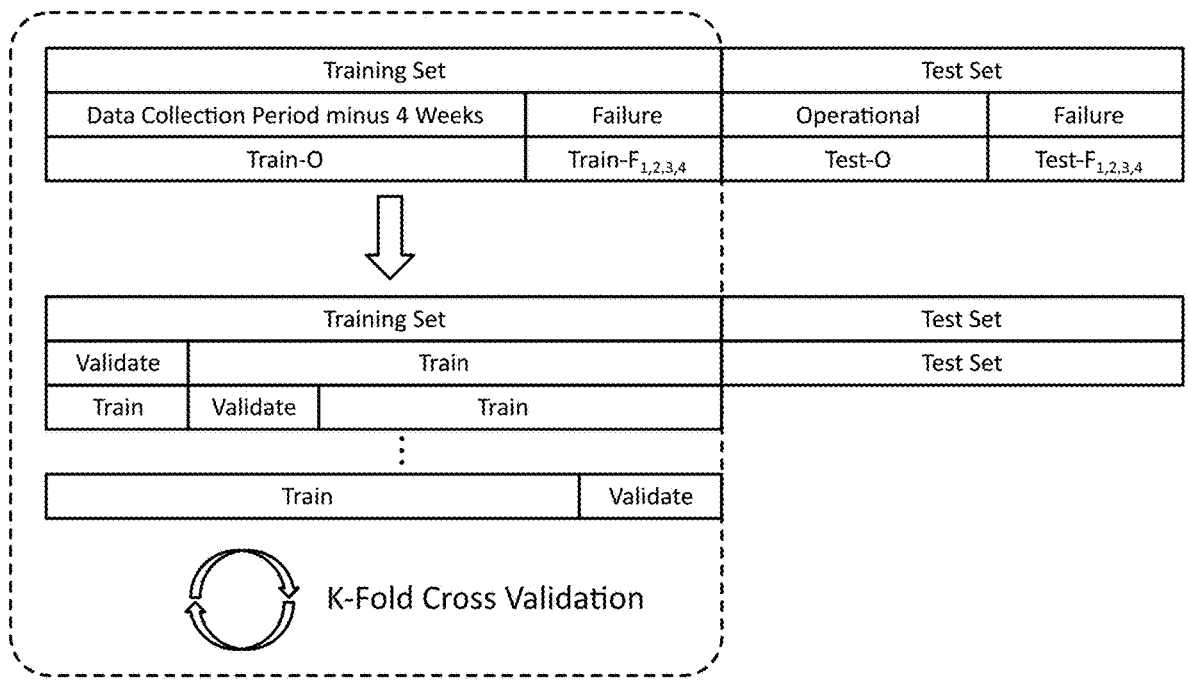
FIG. 8 illustrates an example embodiment of a training/validation operation according to this disclosure.
FIG. 9 illustrates a confusion matrix showing an example of results that may be obtained from a training/validation operation according to this disclosure.

FIG. 8 illustrates an example embodiment of a training/validation operation according to this disclosure. For purposes of illustration, the embodiment illustrated in FIG. 8 may use the training data set from the data splits illustrated in FIGS. 5-7 and may implement a K-fold cross validation process to improve accuracy and/or prevent overfitting. "K" may indicate the number of sections or folds used for cross validation and may be any suitable number, for example 5, 10, 100, etc.

FIG. 9 illustrates a confusion matrix according to this disclosure that may show an example of results that may be obtained from the training/validation operation illustrated in FIG. 8. For purposes of illustration, the training/validation operation may be assumed to have been performed on a pre-processed training dataset that was obtained from self-monitoring telemetry data from a pool of storage devices over multiple years. The raw dataset may have been pre-processed through an DQIF that used three ranking approaches including an information gain ranking filter, a gain ratio feature evaluator, and a correlation ranking filter to rank self-monitoring features and reduce them to a total of, for example, 18 features for use with a machine learning scheme. For purposes of illustration, the machine learning scheme may be implemented with a multi-class random forest algorithm having five output classes: O, $F_1$, $F_2$, $F_3$, and $F_4$ as shown in FIG. 9. The class O may indicate an operational device, whereas the classes $F_1$, $F_2$, $F_3$, and $F_4$ may indicate drives that may fail within the next one, two, three, or four weeks, respectively.

Referring to FIG. 9, correct results from the training/validation operation may fall into cells located diagonally from top left to bottom right—that is, where the predicted class matches the true class. In this example, of a total of 816,164 data points from the training set, all but one were correctly classified. The one incorrect datapoint was predicted to be in class $F_2$ (likely to fail in a one to two week window) while its true class may have been $F_1$ (likely to fail within one week).

Figures 10, 11:
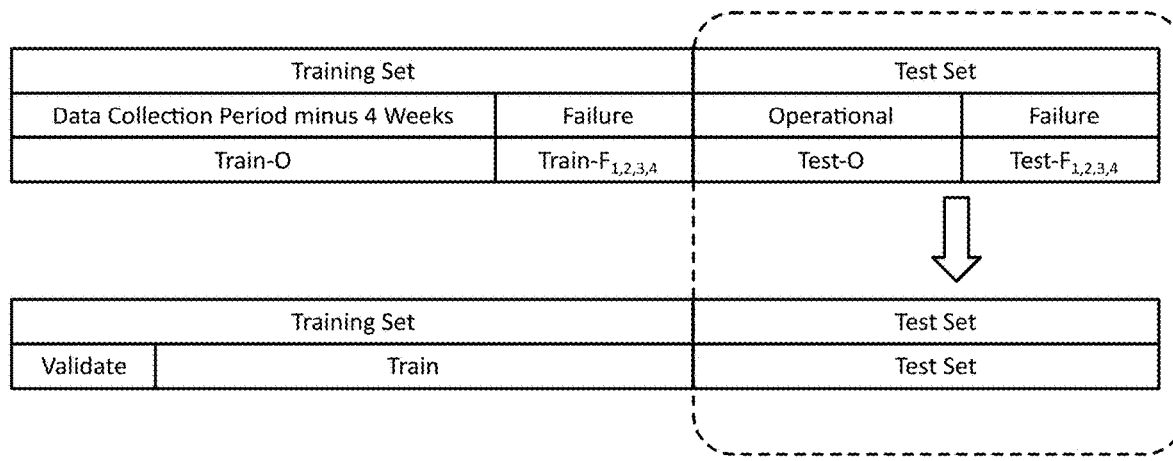
FIG. 10 illustrates an example embodiment of a testing operation according to this disclosure.
FIG. 11 illustrates a confusion matrix that shows an example of results that may be obtained from a test operation according to this disclosure.

FIG. 10 illustrates an example embodiment of a testing operation according to this disclosure. For purposes of illustration, the embodiment illustrated in FIG. 10 may use the testing data set from the data splits illustrated in FIGS. 5-7.

FIG. 11 illustrates a confusion matrix that shows an example of results that may be obtained from the test operation illustrated in FIG. 10. Of a total of 17, 235 data points in the test set, all but 27 where correctly classified. Moreover, even among the data points that were incorrectly classified, none were off by more than one class. The results shown in FIG. 11 may correspond to precision of 0.71, a recall of 0.663, and an F-score of 0.651 using, for example, the formulas described below.

Performance Evaluation

A score that may be used to evaluate the performance of a machine learning scheme according to this disclosure is provided in Eq. 1:

$$\max_{w_i} S_p = \max\left\{\sum_{w_i=0}^{4} w_{p_i} \cdot Precision_M + w_{r_i} \cdot Recall_M + w_{f_i} \cdot Fscore_M\right\} \quad (Eq.\ 1)$$

where a precision component $Precision_M$ may be given by:

$$Precision_M = \frac{\sum_{i=1}^{l} \frac{tp_i}{tp_i + fp_i}}{l} \quad (Eq.\ 2)$$

a recall component $Recall_M$ may be given by:

$$Recall_M = \frac{\sum_{i=1}^{l} \frac{tp_i}{tp_i + fn_i}}{l} \quad (Eq.\ 3)$$

and an F-score component $Fscore_M$ may be given by:

$$Fscore_M = \frac{\sum_{i=1}^{l} \frac{(\beta^2 + 1)Precision_{M_i} Recall_{M_i}}{\beta^2 Precision_{M_i} + Recall_{M_i}}}{l} \quad (Eq.\ 4)$$

where w may represent a weight assigned to a component, l may represent the number of classes, $t_p$, $f_p$, and $f_n$ may represent true positives, false positives, and false negatives, respectively, $\beta$ may represent a parameter that may be used to adjust the relative weights of the precision and recall components, and the subscript M may indicate a macro (as opposed to micro) component. In some embodiments, the use of macro components may help improve the accuracy of a performance score where a dataset is imbalanced between operational (O) and failed ($F_i$) devices, for example, as may occur with SSDs.

Figure 12:
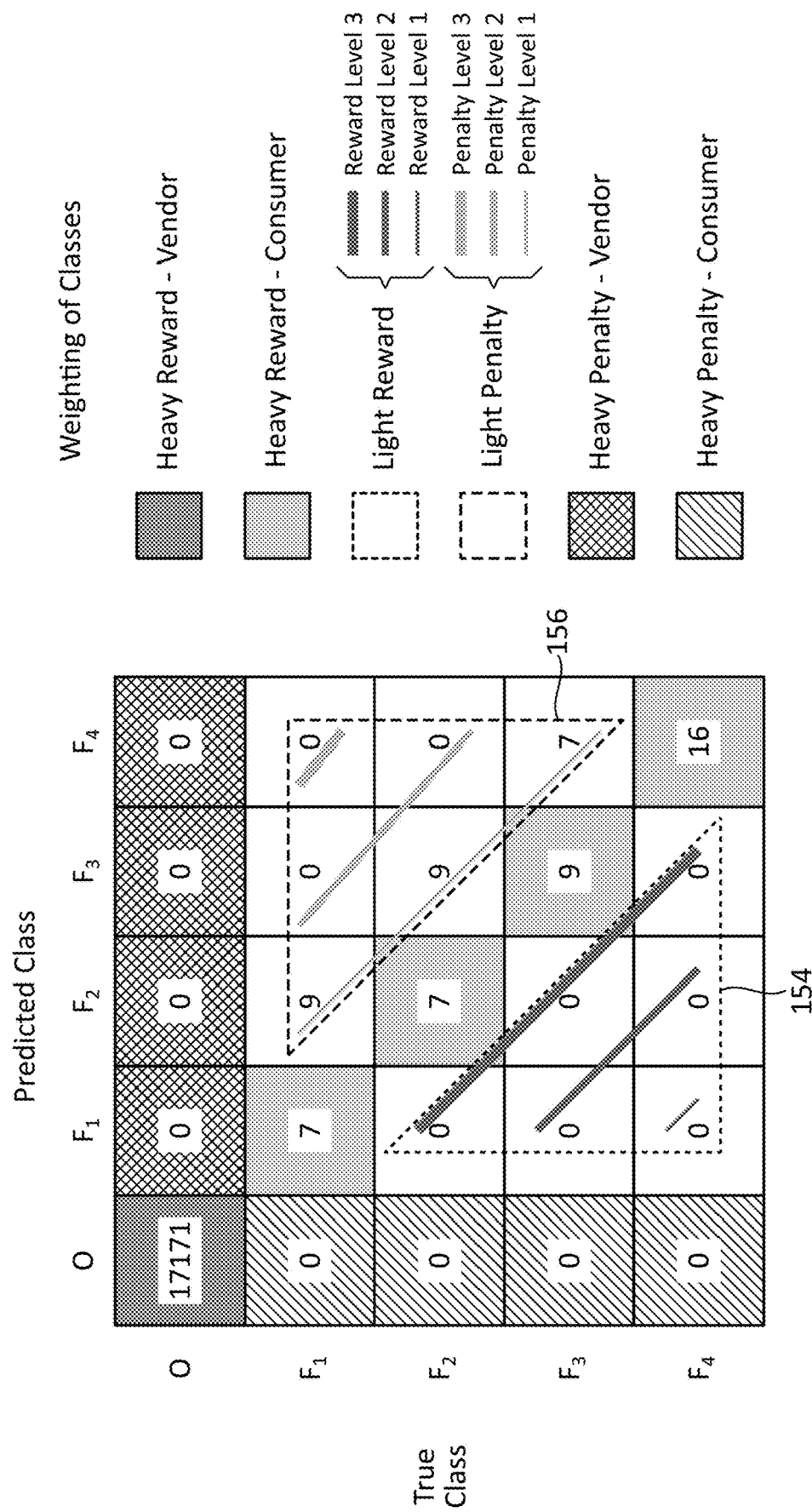
FIG. 12 illustrates an example embodiment of a confusion matrix that may be used to implement a cost function for evaluating a machine learning scheme according to this disclosure.

FIG. 12 illustrates an example embodiment of a confusion matrix that may be used to implement a cost function for evaluating a machine learning scheme according to this disclosure. The embodiment illustrated in FIG. 12 may implement a system of rewards and penalties based on the accuracy of predictions from the perspectives of both a vendor and a consumer of the device. For purposes of illustration, the embodiment shown in FIG. 12 may use the same number of total data points as the embodiment illustrated in FIG. 11, but with a different distribution of predictions. However, the features illustrated with respect to FIG. 12 may be applied to any results with any cost function and/or confusion matrix having any number of classes, and/or the like.

In some embodiments, the upper left cell of the matrix may carry a heavy reward (as shown by dark shading) for a vendor because, for example, a vendor may have an incentive to allow operational devices to remain in operation. The four cells extending diagonally toward the bottom right (as shown by light shading) may carry a heavy reward for a consumer because, for example, correctly predicting an impending failure may enable the consumer to repair or replace a device before it may cause data corruption, data loss, and/or system downtime.

In contrast, incorrectly classifying an operational device in class $F_1$, $F_2$, $F_3$ or $F_4$ (as shown by the cross-hatching) may carry a heavy penalty for a vendor because, for example, an operational device may be returned under warranty, thereby creating an unnecessary expense for the vendor. However, incorrectly classifying an $F_1$, $F_2$, $F_3$ or $F_4$ device (which may be likely to fail in one, two, three or four weeks, respectively) as an operational device (as shown by diagonal hatching) may be carry a heavy penalty for a consumer because, for example, the consumer may experience data corruption, data loss, and/or system downtime due to the unpredicted failure of the device.

Cells located in region 154 may be characterized as "early" predictions because the machine learning scheme may predict the device may fail earlier that it actually may fail. The cells located in region 156 may be characterized as "late" predictions because the machine learning scheme may predict the device may fail later that it actually may fail.

In some embodiments, predictions in the early region 154 may carry a light reward. In some embodiments, the level of reward may be greater for a greater level of accuracy with region 154 as shown by the relative thickness of the bars running diagonally through the region. For example, if a device having a true class of $F_2$ (two-week failure window) is classified into class $F_1$ (one-week failure window), it may carry a level-3 light reward. However if a true class $F_4$ device (four-week failure window) is classified as a class $F_1$ device (one-week failure window), it may carry a level-1 (lowest level) light reward.

In some embodiments, predictions in the late region 156 may carry a light penalty. In some embodiments, the level of penalty may be greater for a lower level of accuracy with region 156 as shown by the relative thickness of the bars running diagonally through the region. For example, if a device having a true class of $F_1$ (one-week failure window) is classified into class $F_4$ (four-week failure window), it may carry a level-3 light penalty. However if a true class $F_1$ device (one-week failure window) is classified as a class $F_2$ device (two-week failure window), it may carry a level-1 (lowest level) light penalty.

In some embodiments, the performance score, precision value, recall value, F-score, cost function and/or confusion matrices described above may enable a user to evaluate the performance of a machine learning scheme, as well as the effectiveness of a dataset on the training, validation, testing, and/or the like on a scheme, and may enable a user to compare different schemes, datasets, and/or the like. Moreover, reducing or minimizing a customer defined cost function may improve or optimize the prediction performance of a scheme.

In some embodiments, the various techniques described in this disclosure may also be used iteratively. For example, a first iteration of a machine learning scheme may be developed by applying a DQIF to a dataset to generate a pre-processed dataset which may then be used to train, validate and test a scheme. One or more of the performance evaluation techniques such as a performance score, cost function, and/or confusion matrix may be applied to the scheme to provide additional information about the scheme. Using this additional information, a user may repeat one or more of the other operations one or more times to further refine the machine learning mode.

Figure 13:
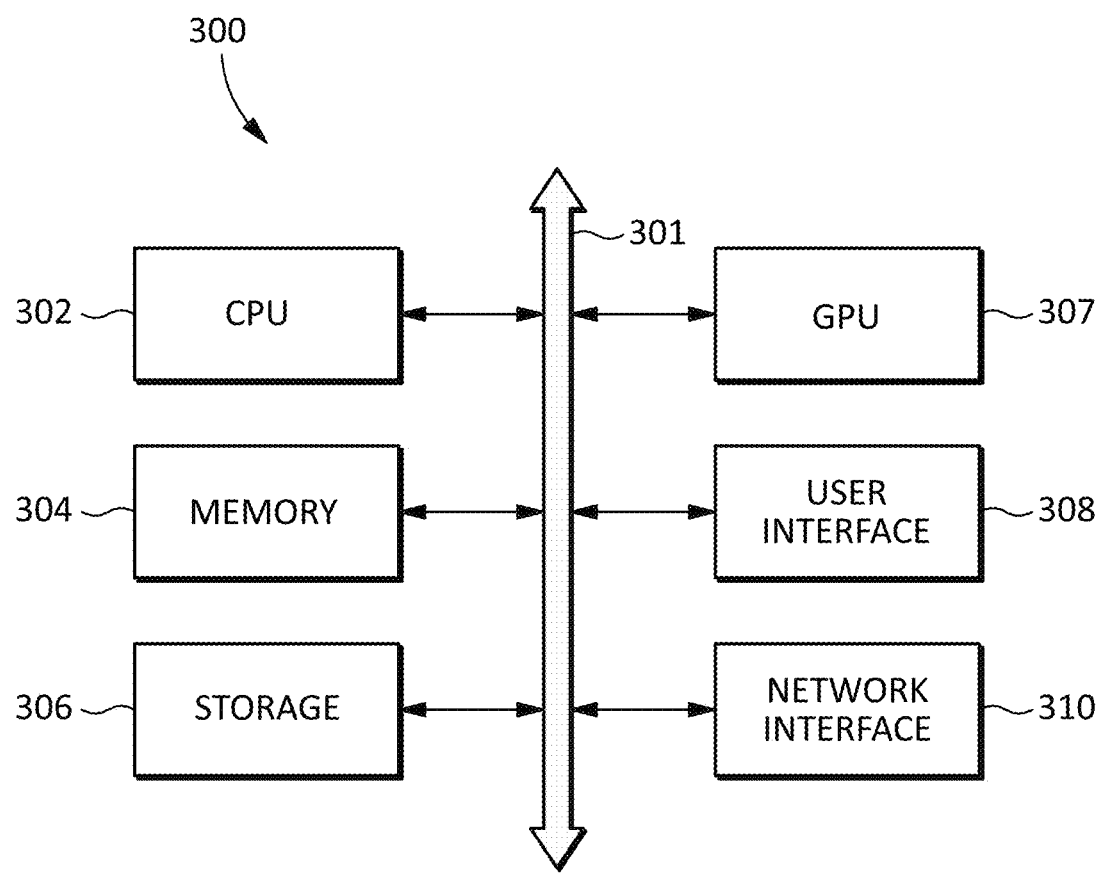
FIG. 13 illustrates an embodiment of a computing system according to this disclosure.

FIG. 13 illustrates an embodiment of a computing system according to this disclosure. The system 300 of FIG. 13 may be used, for example, to implement any or all of the methods and/or apparatus described in this disclosure. The system 300 may include a central processing unit (CPU) 302, memory 304, storage 306, a graphics processing unit (GPU) 307, a user interface 308, and a network interface 310. In different embodiments, the system may omit any of these components or may include duplicates, or any additional numbers of, any of the components, as well as any other types of components to implement any of the methods and/or apparatus described in this disclosure.

In some embodiments, the GPU 307 may be used for machine learning operations such as DQI operations, training, validating, testing, performance evaluation, and/or the like.

The CPU 302 may include any number of cores, caches, bus and/or interconnect interfaces and/or controllers. The Memory 304 may include any arrangement of dynamic and/or static RAM, nonvolatile memory (e.g., flash memory) etc. The storage 306 may include hard disk drives (HDDs), solid state drives (SSDs), and/or any other type of data storage devices or any combination thereof. The user interface 308 may include any type of human interface devices such as keyboards, mice, monitors, video capture or transmission devices, microphones, speakers touchscreens, etc. as well as any virtualized or remote versions of such devices. The network interface 310 may include one or more adapters or other apparatus to communicate through Ethernet, Wi-Fi, Bluetooth, or any other computer networking arrangement to enable the components to communicate through physical and/or logical networks, such as an intranet, the Internet, local area networks, wide area networks, etc.

Any or all of the components of the system 300 may be interconnected through a system bus 301 which may collectively refer to various interfaces including power buses, address and data buses, high-speed interconnects such as Serial AT Attachment (SATA), Peripheral Component Interconnect (PCI), Peripheral Component Interconnect Express (PCI-e), System Management Bus (SMB), and any other types of interfaces that may enable the components to work together, either locally at one location, and/or distributed between different locations.

The system 300 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 300 to work together to implement any or all of the methods and/or apparatus described in this disclosure. Any of the components of the system 300 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The operations a method or algorithm and functions described in connection with the embodiments disclosed herein may be embodied directly in hardware, in one or more software modules executed by a processor, or in a combination of the two, including in the system 300. If implemented in software, functions may be stored or transmitted as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. Any system disclosed herein, or component or portion thereof, may be implemented as a part of a software stack of a larger system, for example, a graphics processing unit (GPU) or other larger system. Any system disclosed herein, or component or portion thereof, may be implemented as its own software stack.

The embodiments disclosed herein may have been described in the context of various implementation details, but the features of this disclosure are not limited these or any other specific details. For example, some embodiments have been described in the context of time-to-fail predictions for storage devices, but the inventive features may be applied to other types of devices as well. Some functionality has been described as being implemented by certain components, but in other embodiments, the functionality may be distributed between different systems and components in different locations and having various user interfaces. Certain embodiments have been described as having specific processes, steps, combinations thereof, and/or the like, but these terms may also encompass embodiments in which a specific process, step, combinations thereof, and/or the like may be implemented with multiple processes, steps, combinations thereof, and/or the like, or in which multiple process, steps, combinations thereof, and/or the like may be integrated into a single process, step, combinations thereof, and/or the like. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive features of this patent disclosure. Various organizational aids such as section headings may be provided as a convenience, but the subject matter arranged according to these aids and the features of this disclosure are not limited by these organizational aids.

Since the inventive features of this patent disclosure may be modified in arrangement and detail without departing from the inventive concepts, such changes and modifications are considered to fall within the scope of the following claims.

The invention claimed is:

1. A method for predicting a time-to-failure of a target storage device, the method comprising:
training a machine learning scheme with a time-series dataset of operational and failure data from one or more storage devices;
receiving telemetry data from the target storage device, the telemetry data including data regarding a state of the target storage device; and
inputting the telemetry data to the machine learning scheme;
wherein the machine learning scheme outputs a time-window based time-to-failure prediction for the target storage device in response to the telemetry data.

2. The method of claim 1, wherein:
the machine learning scheme outputs at least two classes; and
one or more of the at least two classes comprise time windows.

3. The method of claim 2, wherein training the machine learning scheme comprises splitting the time-series dataset into time windows, and a class corresponds to a time window.

4. The method of claim 3, wherein the operational and failure data are split into time windows based on a time-to-failure.

5. A method for training a machine learning scheme for predicting a time-to-failure of a storage device, the method comprising:
pre-processing a time-series dataset of operational and failure data from one or more storage devices, thereby generating a pre-processed dataset; and
training the machine learning scheme with the pre-processed dataset,
wherein the machine learning scheme generates a time-window based time-to-failure prediction.

6. The method of claim 5, wherein:
the time-series dataset comprises one or more features associated with a storage device; and
the method further comprises ranking at least two of the features.

7. The method of claim 6, further comprising limiting a number features included in the pre-processed dataset, thereby reducing a dimension of the pre-processed dataset.

8. The method of claim 6, further comprising ranking the features by at least one of recursive feature elimination, correlation attribute evaluation, gain ratio attribute evaluation, or information gain attribute evaluation.

9. The method of claim 5, further comprising removing noise from at least a portion of the time-series dataset.

10. The method of claim 5, further comprising modifying at least a portion of the time-series dataset by at least one of data transformation, data aggregation, or data standardization.

11. The method of claim 5, further comprising removing at least one redundant feature of the features.

12. A method for training a machine learning scheme for predicting a time-to-failure of a storage device, the method comprising:
receiving a time-series dataset of operational and failure data from one or more storage devices;
training the machine learning scheme with a first portion of the time-series dataset;
testing the machine learning scheme with a second portion of the time-series dataset to produce a result; and
evaluating the machine learning scheme based at least in part on the result.

13. The method of claim 12, wherein evaluating the machine learning scheme comprises calculating a performance score.

14. The method of claim 13, wherein the performance score comprises one or more of a precision component, a recall component, or an F-score component.

15. The method of claim 13, wherein the performance score is based on two or more components, and a maximum of the two or more components is used as the performance score.

16. The method of claim 15, wherein one or more of the two or more components are weighted.

17. The method of claim 12, wherein the machine learning scheme is evaluated with a cost function.

18. The method of claim 17, wherein:
    the cost function comprises a user-defined cost function; and
    the method further comprises minimizing the user-defined cost function.

19. The method of claim 17, wherein the cost function is based on a confusion matrix.

20. The method of claim 19, wherein the confusion matrix comprises one or more weight classes for rewards or penalties associated with early or late predictions, respectively.

21. The method according to claim 5, wherein the time-series dataset of operational and failure data from one or more storage devices includes data regarding states of the one or more storage device.

* * * * *